No. 691,487. Patented Jan. 21, 1902.
G. H. REYNOLDS.
ROLLER BEARING FOR CRANK SHAFTS OR THE LIKE.
(Application filed Aug. 8, 1901.)
(No Model.)
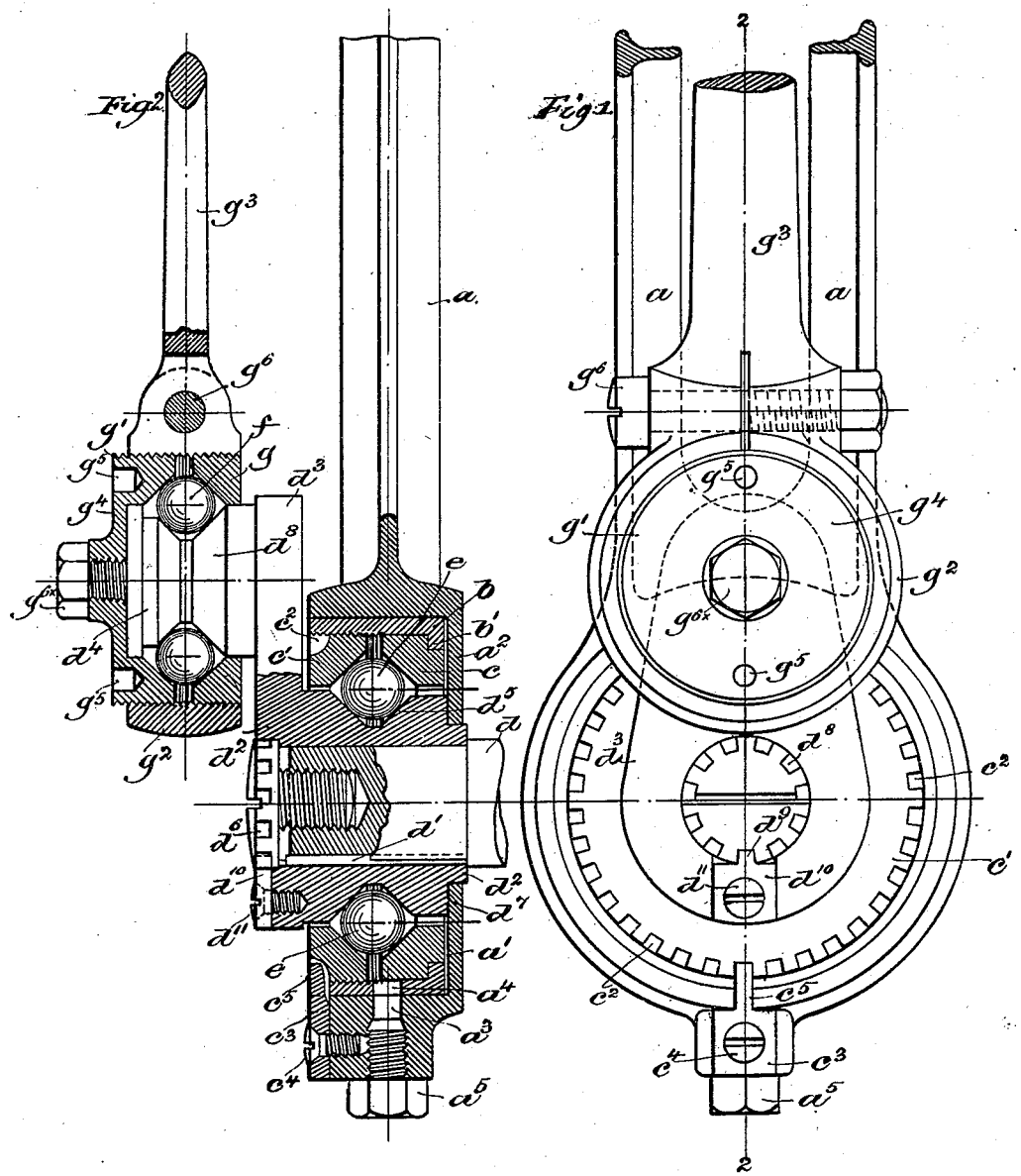
WITNESSES:
INVENTOR
George H. Reynolds,
BY
ATTORNEY

UNITED STATES PATENT OFFICE.

GEORGE H. REYNOLDS, OF MANSFIELD DEPOT, CONNECTICUT, ASSIGNOR TO THE "LOCOMOBILE" COMPANY OF AMERICA, OF NEW YORK, N. Y., A CORPORATION OF WEST VIRGINIA.

ROLLER-BEARING FOR CRANK-SHAFTS OR THE LIKE.

SPECIFICATION forming part of Letters Patent No. 691,487, dated January 21, 1902.

Application filed August 8, 1901. Serial No. 71,296. (No model.)

*To all whom it may concern:*

Be it known that I, GEORGE H. REYNOLDS, a citizen of the United States, residing at Mansfield Depot, in the county of Tolland and State of Connecticut, have invented an Improvement in Roller-Bearings for Crank-Shafts or the Like, of which the following description, in connection with the accompanying drawings, is a specification, like letters on the drawings representing like parts.

This invention has for its object to improve the construction of ball-bearings, particularly with reference to their use in steam-engines.

In the construction of light high-speed engines—such, for instance, as now extensively used in connection with automobiles—ball-bearings for the crank-shaft and cranks are extensively used; but as at present constructed and used such bearings are usually open to serious objections, particularly in that inadequate provision is made for taking up wear in or for adjusting said bearings. Attempts to provide means for adjusting or taking up wear in bearings of this sort have usually resulted in destroying the alinement or proper running positions of some of the moving parts.

I will first disclose my invention in connection with one embodiment thereof, from which the nature of the invention will be better understood.

In the drawings accompanying this specification, Figure 1, in side elevation, shows a portion of a steam-engine equipped with bearings made in accordance with my invention, sufficient parts being shown to enable the invention to be understood; and Fig. 2, a vertical section on the dotted line 2 2, the crank and part of the crank-shaft being shown mainly in elevation.

In the embodiment of my invention selected for illustration thereof and shown in the drawings, $a$ indicates part of one of the side frames of the engine, of which there are usually two substantially similar frames that sustain at one of their ends the crank-shaft, the second frame being herein omitted. It is to be understood, however, that the construction of bearing for the second frame and adjacent parts may be similar to the parts shown and described.

The frame $a$ herein at its lower end is provided with a cylindrical recess $a'$, provided at one side—herein at the inner side of the frame—with an annular wall $a^2$, that partially closes the recess at that side of the frame. Within the recess $a'$ is a ring-like receiver $b$, having at one edge an inturned flange $b'$, and within this receiver are arranged the outer ring-like cone-bearings $c\ c'$. The bearing-ring $c$ is shown as fitting tightly the inner bore of the receiver $b$, together with the inturned flange $b'$ thereof, while the bearing-ring $c'$ is threaded exteriorly and is screwed into the outer portion of the receiver $b$, that is interiorly threaded for the purpose.

The crank-shaft is shown at $d$, it having secured upon its end in suitable manner, as by the feather $d'$, the hub $d^2$ of the crank $d^3$, provided with a crank-pin $d^4$. The crank-hub $d^2$ is shown as provided with a circumferential groove $d^5$, conical in cross-section—that is, formed to present tapering side walls, between which and the adjacent tapering or conical walls or surfaces of the rings $c\ c'$ is arranged a series of balls $e$. The outer bearing member, shown as multipart and herein formed by the rings $c\ c'$, and the inner bearing member, herein formed by the converging walls of the conical hub-groove $d^5$, together with the intervening balls $e$, constitute a ball-bearing in which the crank-shaft may turn freely and without appreciable friction. The crank $d^3$ is prevented from working off from the end of the crank-shaft by suitable means, as the screw $d^6$, tapped into the end of said shaft. As here shown, the screw $d^6$ is provided with peripheral notches $d^8$, that receive a locking-finger $d^9$ on a locking-plate $d^{10}$, secured to the crank or its hub in suitable manner, as by a screw $d^{11}$. The bearing-ring $c'$ may be secured against rotation in desired manner, I having here provided the same with a series of circumferential notches or pockets $c^2$, with which coöperates a locking-plate $c^3$, secured to the bottom of the frame, as by a screw $c^4$, said locking-plate having a projecting finger $c^5$, that enters one or another of the notches $c^2$, thus locking the said ring against rotation. By slackening the screw $c^4$ and lifting or removing the locking-plate $c^3$ the ring $c'$ may be rotated in either direction necessary for proper adjustment of the bearing.

It will be noticed that the receiver $b$ is loosely carried in the recess of the frame, so that it is free to slide therein axially—that is, in the direction of the axis of the bearing. This is useful in that it permits the ring-like outer bearing member $c\ c'$ during adjustment to adjust itself automatically relative to the axially-fixed inner bearing-surfaces of the groove $d^5$ in the crank-hub, so that perfectly-free and adequate adjustment may at all times be had without danger of destroying the alinement of the bearings or of throwing out of alinement or working position the crank or other rotating part that may turn in the bearings.

Removal of the screw $d^6$ permits the entire crank, its hub, and bearing, including the receiver $b$, to be removed from the frame $a$.

The crank-hub is provided at its inner end with a stop-surface $d^7$, that coöperates with the inturned annular wall or flange $a^2$ of the frame to prevent endwise movement of the crank-shaft. Thus it will be seen that the crank-shaft when once properly positioned within the frame $a$ may run indefinitely, and its bearings may be adjusted freely without fear of destroying the alinement of the shaft or the parts of the bearings.

The frame $a$ at its lower end is shown as provided with a threaded passage $a^3$, that communicates with a circumferential opening $a^4$ in the receiver $b$ and through which graphite, grease, or other suitable lubricant may be inserted to furnish such lubrication as the bearing may need. This passage $a^3$ is normally closed by a plug-screw $a^5$. The crank-pin $d^4$, as here shown, is also provided with a circumferential groove $d^8$, the converging or conical walls whereof constitute the inner bearing-surfaces of a bearing that includes the balls $f$. The outer bearing-surfaces for this crank-pin bearing are formed in the conical rings $g\ g'$, screwed into the receiver $g^2$, (shown as a split socket formed in the end of the connecting rod or pitman $g^3$.) The conical ring $g'$ is shown as closed at its outer side by a plate portion $g^4$ to conceal the end of the crank-pin and exclude dust therefrom, the said ring being also provided with diametrically-arranged recesses $g^5$ to receive a usual spanner by which to rotate the said ring, and thereby adjust the said bearing. The ring is held in its adjusted position by compression of the split receiver through the medium of the compression screw or bolt $g^6$.

While the construction of bearing shown and described for the crank-shaft might also be employed for the crank-pin, and vice versa, yet in practice I have found that the free axial movement of one part of the bearing relative to the member that carries it is not usually essential in connection with the crank-pin bearing, for the freedom in the crank-pin and wrist-pin bearings is sufficient to permit the outer end of the connecting-rod to swing sidewise sufficiently to accommodate any ordinary adjustment of the bearing.

The plate-like portion $g^4$ of the outer bearing $g'$ is shown as provided with a central aperture normally closed by the plug-screw $g^{6\times}$, through which graphite, grease, or other lubricant may be pressed into the space within the parts of the bearing for such lubrication as may be desired.

I have here shown the rotatable members of the bearings described—viz., the crank-hub and the crank-pin—as integral members in which the ball-grooves are turned; but these circumferentially-grooved rotatable members, so far as my invention is concerned, may be otherwise formed, and while I prefer the integral formation of the grooves in these members, yet such grooves or the inclined walls thereof may be otherwise or independently formed, if desired.

A construction in accordance with my invention here disclosed provides for all necessary adjustments and for ready adjustment of the necessary parts and at the same time insures correct alinement and positioning of the running parts, freedom of rotating parts from complicated construction, also accessibility of the adjustable parts, all of which is extremely desirable in light-running high-speed engines, such as used in automobile service.

It will be noticed that my bearing is what may be termed a "four-point" bearing—that is, the ball has four points of contact symmetrically arranged—two of which are upon one member and two upon the other member thereof. Thus I obtain a bearing wherein there may be a direct thrust perpendicular to the axis of the bearing with no tendency whatever to throw any member of the bearing to one side or out of alinement and with no side thrust due to the end thrust. Furthermore, the free axial or automatic movement of one of the bearing members relative to the other enables the balls always to find a bearing at the four necessary points, thus eliminating any tendency to side thrust.

My invention is not limited to the particular embodiment or form thereof here shown, as obviously it may be varied within the spirit and scope of the invention disclosed.

What I claim, and desire to secure by Letters Patent, is—

1. A ball-bearing comprising axially-fixed and freely axially movable bearing members, a receiver for the latter of said members and freely axially movable therewith and balls arranged between said members.

2. A ball-bearing comprising a rotatable, circumferentially-grooved member, a series of balls arranged in said groove, an opposed multipart bearing member coöperating with said balls, one of the parts of said opposed bearing member being adjustable toward and from the other part thereof, said opposed bearing member having a free, axial movement relative to said rotatable member.

3. A ball-bearing comprising a rotatable circumferentially-grooved member, an opposed multipart bearing member, with balls arranged between the same and said grooved rotatable member, the parts of said multipart bearing member being adjustable one relative to another, and a freely axially movable receiver for said multipart bearing member.

4. A ball-bearing comprising a rotatable, circumferentially-grooved member, an opposed multipart bearing member, a freely axially movable receiver for said multipart bearing member and in which the parts of the latter are adjustable one relative to the other, and means to retain the parts of such multipart bearing member in adjusted position without interfering with the free axial movement thereof with said receiver.

5. A ball-bearing comprising a rotatable, circumferentially-grooved member, balls arranged in the said groove, an axially-movable receiver, a multipart bearing member arranged therein, one of the parts of said member having threaded engagement with said receiver, and means to retain the parts of said multipart member in adjusted position in said receiver.

6. A ball-bearing comprising a rotatable, circumferentially-grooved member, balls arranged in the groove of said member, a flanged receiver, a multipart bearing arranged within said receiver, one of the parts of said bearing being seated against the flange of said receiver, the other part of said bearing having threaded engagement with said receiver.

7. A ball-bearing comprising a recessed frame or support, a freely axially movable receiver therein, bearing-rings contained in said receiver and adjustable one toward the other, a rotatable, circumferentially-grooved member, and balls arranged between the same and said bearing-rings.

8. A ball-bearing comprising a recessed support or frame, a freely axially movable receiver arranged therein, bearing-rings contained in said receiver, one of said rings being in threaded engagement with said receiver, and locking means on the said frame or support to retain said threaded ring in adjusted position, a circumferentially-grooved rotatable member, and balls arranged between the same and said bearing-rings.

9. A recessed frame member or support, a freely axially movable receiver therein, bearing-rings in said receiver and adjustable one relative to the other, a bearing member in the form of a crank opposed to said bearing-rings with balls interposed between the latter and said crank, a rotatable shaft for said crank and from which the latter is endwise removable, a screw confining said crank upon said shaft, and means to lock said screw against rotation whereby said crank, receiver bearing-rings and balls may be removed from said shaft and from said frame member.

10. A ball-bearing comprising a rotatable member, a series of balls arranged in contact therewith, an opposed multipart bearing member coöperating with said balls, said opposed bearing member and said rotatable member having free axial movement one relative to the other, one of the parts of said opposed bearing member being also adjustable toward and from the other part thereof.

In testimony whereof I have signed my name to this specification in the presence of two subscribing witnesses.

GEORGE H. REYNOLDS.

Witnesses:
FREDERICK L. EMERY,
A. E. CHESLEY.